United States Patent [19]
Mittleman et al.

[11] Patent Number: 5,236,290
[45] Date of Patent: Aug. 17, 1993

[54] ADJUSTABLE HOLE CUTTING DEVICE

[76] Inventors: M. Budd Mittleman, 35 Sutton Pl., New York, N.Y. 10022; Franklin E. Loew, 875 Fifth Ave., New York, N.Y. 10021

[21] Appl. No.: 851,503

[22] Filed: Mar. 16, 1992

[51] Int. Cl.⁵ .............................................. B23B 51/00
[52] U.S. Cl. ..................... 408/183; 408/185; 408/713
[58] Field of Search .................... 30/300; 408/181, 182, 408/183, 184, 185, 201, 233, 713, 200

[56] References Cited

U.S. PATENT DOCUMENTS

| | | | |
|---|---|---|---|
| 142,133 | 8/1873 | Weicke | 408/181 |
| 733,821 | 7/1903 | Dixon | 408/183 |
| 1,436,974 | 11/1922 | Michalczyk | 408/183 |
| 2,225,224 | 12/1940 | Landrum | 408/185 |
| 2,906,145 | 9/1959 | Morse | 408/181 |
| 3,130,610 | 4/1964 | Bogdan | 408/201 |
| 4,135,846 | 1/1979 | Nowakowski | 408/183 |

FOREIGN PATENT DOCUMENTS 641301  8/1928  France ................................ 408/239

*Primary Examiner*—Daniel W. Howell
*Attorney, Agent, or Firm*—Howard C. Miskin

[57] ABSTRACT

A circle cutter includes a beam with a central arbor and a pair of tool holders concurrently oppositely adjustable along the beam and having a pair of vertically spaced longitudinal bores carrying screws for engaging cutting members. An extension member engages the tool holder outer face and is detachably attached by screws engaging bores in the extension member and those in the tool holder and used for securing a tool to the extension outer face. A threaded third bore is formed in the extension below the first pair permitting the vertical adjustment of the attached tool.

8 Claims, 2 Drawing Sheets

ADJUSTABLE HOLE CUTTING DEVICE

BACKGROUND OF THE INVENTION

The present invention relates generally to improvements in tools and it relates particularly to an improved circle or hole cutter.

In the cutting of holes or circles, a bit or cylindrical saw is commonly employed which is replaceably held and driven by a motor driven chuck. Such tools possess many drawbacks and disadvantages. The diameters of the circles or holes vary by increments and require a different cutting tool or bit for each hole or circle diameter and it is impossible to drill or cut holes or circles of non-standard diameters with conventional tools of this type. A circle- or hole-cutting tool has been available which overcomes the aforesaid drawbacks. Such a tool includes an arbor supported beam which includes a pair of tool holding blocks continuously concurrently adjustable along the length of the block symmetrically at right angles to the axis of the arbor. While such a tool is highly satisfactory and permits the cutting of circles and holes of continuously varying sizes, the range of such sizes has heretofore been limited thereby somewhat restricting the use of such tool.

SUMMARY OF THE INVENTION

It is a principal object of the present invention to provide an improved tool.

Another object of the present invention is to provide an improved rotary hole- or circle-cutting tool.

Still another object of the present invention is to provide an improved rotary adjustable circle-cutting tool.

A further object of the present invention is to provide an improved rotary circle-cutting tool which may be adjusted over a wide continuous range.

Still a further object of the present invention is to provide an improved device for extending the diameter cutting range of a rotary circular cutting tool.

Still a further object of the present invention is to provide a tool of the above nature characterized by its ruggedness, ease and simplicity of application, its low cost and high versatility and adaptability.

The above and other objects of the present invention will become apparent from a reading of the following description taken in conjunction with the accompanying drawings which illustrate a preferred embodiment thereof.

A circle-cutting device in accordance with the present invention includes a longitudinal beam and a medially located arbor and a pair of tool holders supported by and adjustable along the length of the beam symmetrical to the axis of the arbor, each tool holder having a tool engaging outside face and a pair of vertically spaced threaded longitudinal bores, the improved device being characterized by the provision of a pair of tool holder extensions, each extension having an inside face engaging the outside face of a respective tool holder and a pair of vertically spaced bores axially aligned with the respective tool holder bores, the extension and a tool holder being releasably locked in assembled condition by a screw engaging each pair of aligned bores as well as a respective one of a pair of mounting holes in the upper part of a depending cutting member.

Advantageously, a threaded third bore is formed in the tool holder extension below the lowermost other bore a distance equal to that between the upper two bores permitting the adjustment of the depending length of the cutting member. Thus, with the present improved circle-cutting device, the range of the diameter of the circle or hole which may be cut or drilled is greatly increased.

DESCRIPTION OF THE PREFERRED EMBODIMENT

Figure 1:
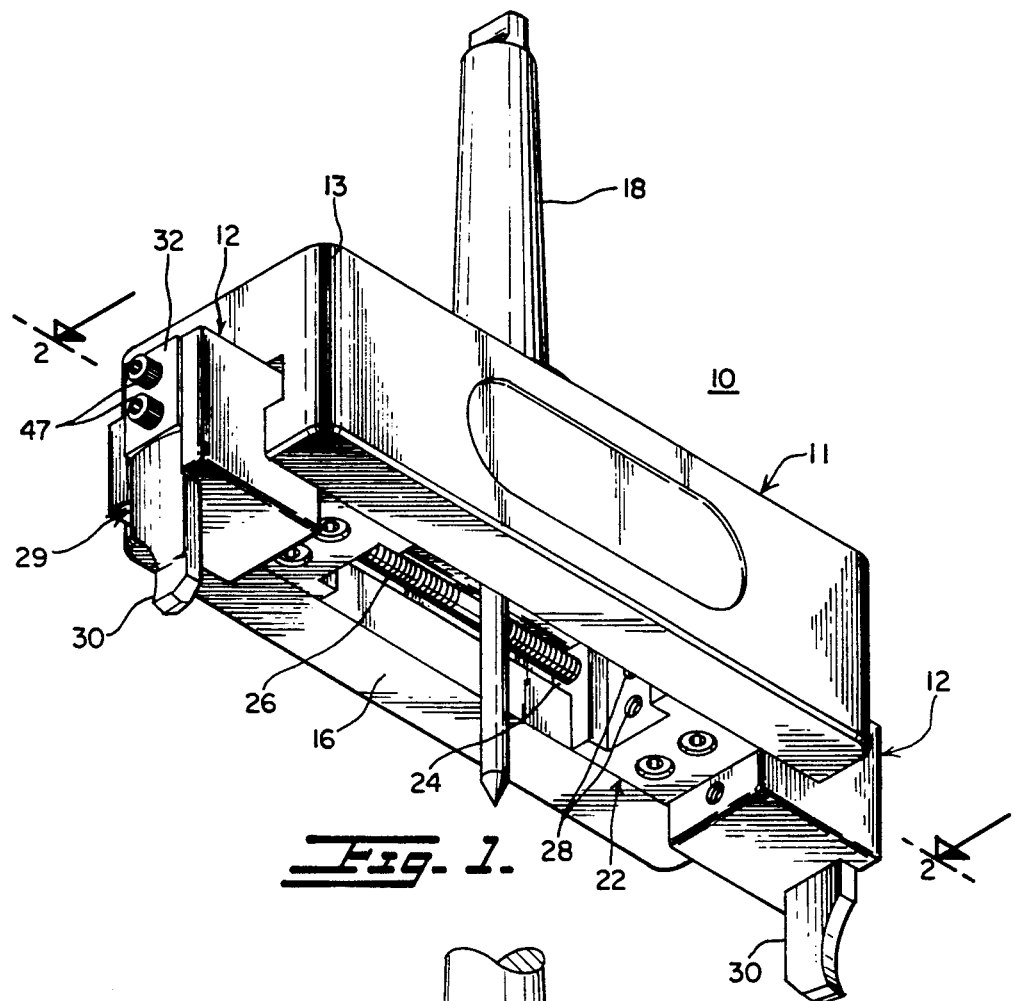
FIG. 1 is a perspective view of an assembled hole-cutting device in accordance with the present invention.
Figure 2:
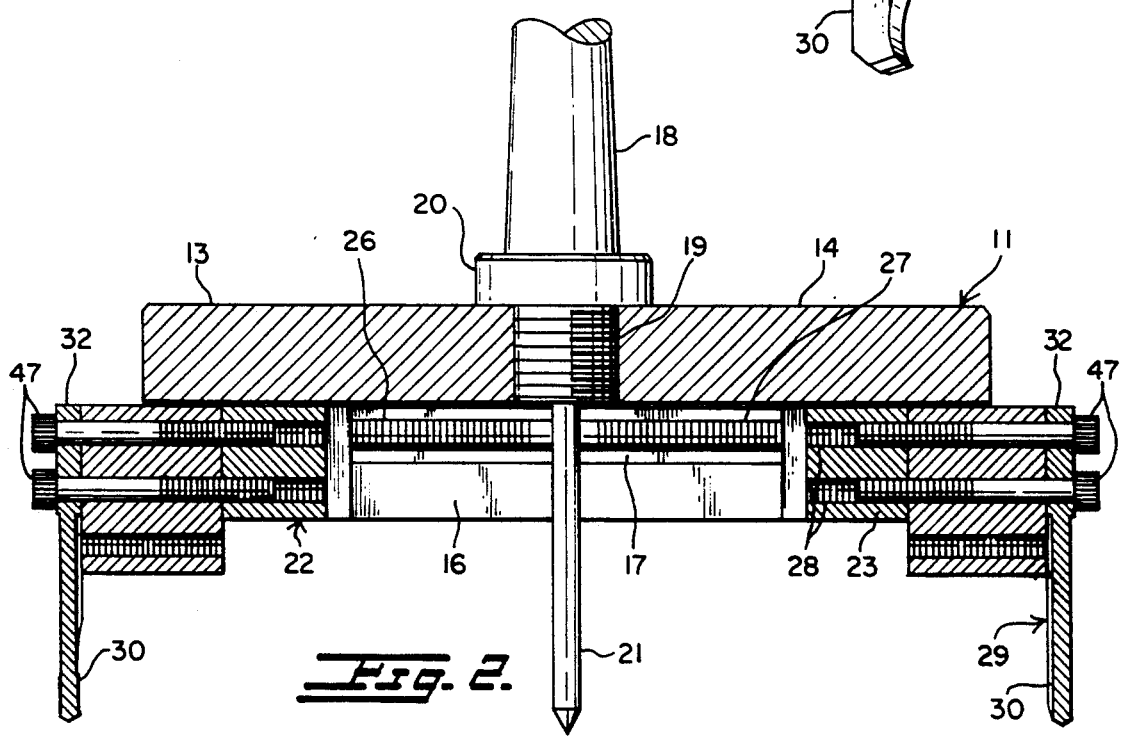
FIG. 2 is an enlarged cross section taken along lines 2-2 of FIG. 1.
Figure 3:
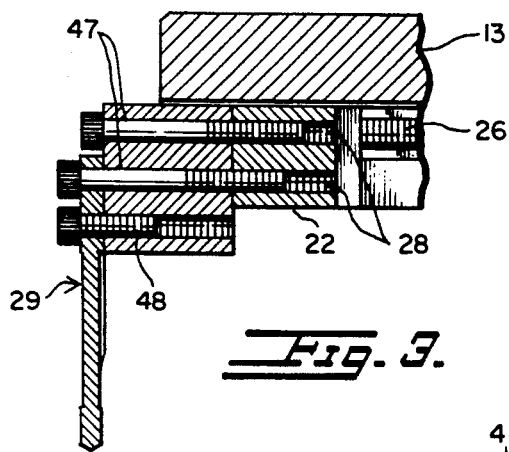
FIG. 3 is a detail sectional of the mounting of one cutter.
Figure 4:
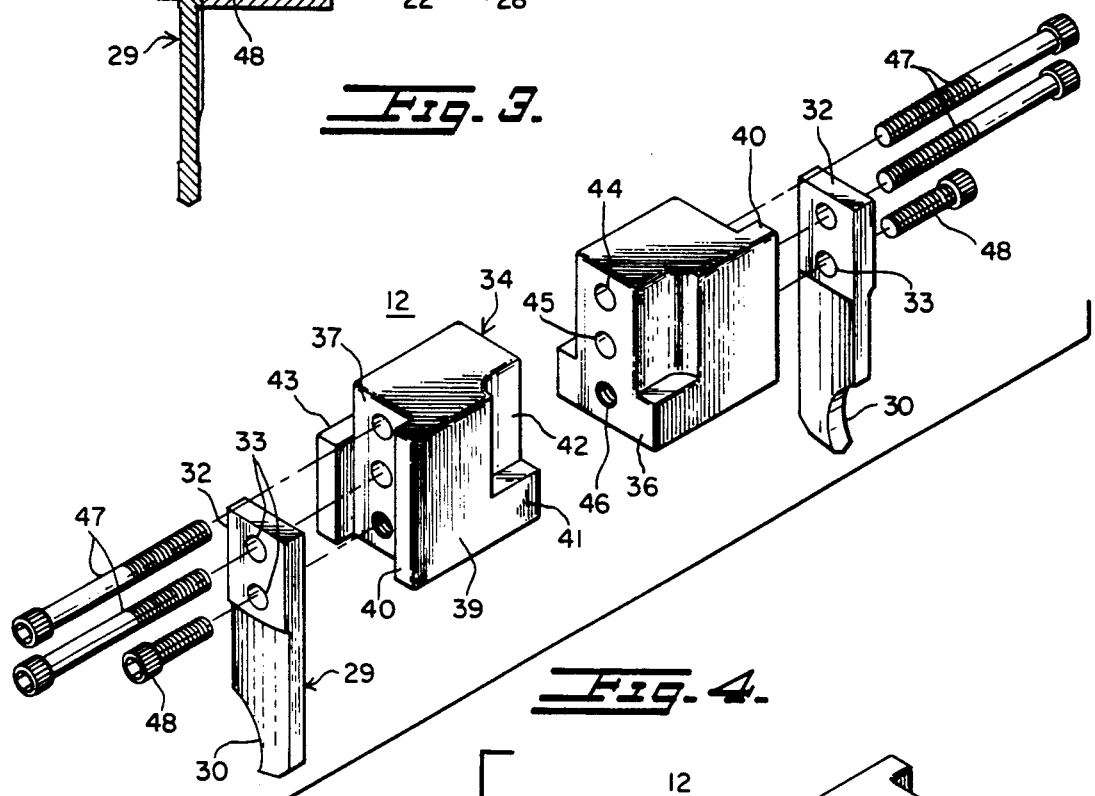
FIG. 4 is an exploded view of a hole-cutting device.
Figure 5:
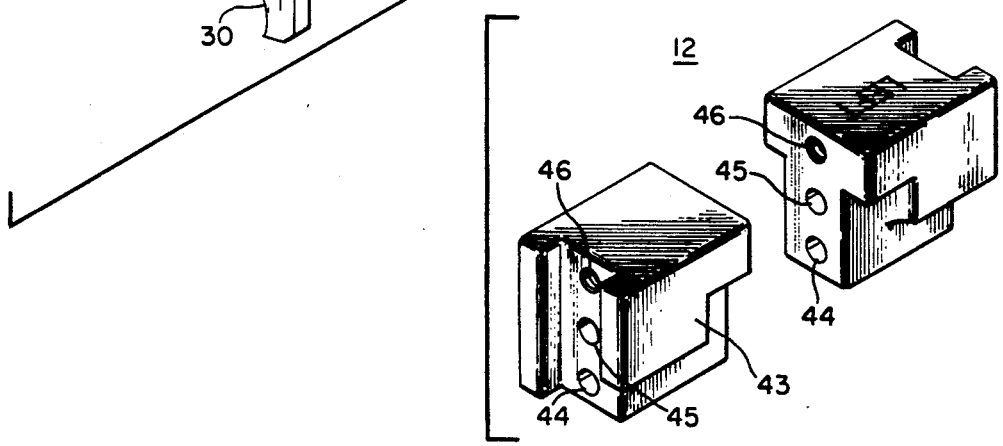
FIG. 5 is an inverse view of the tool holder extensions.

Referring now to the drawings which illustrate a preferred embodiment of the present invention, the reference numeral 10 generally designates the improved circle- or hole-cutting device which includes a base circle cutter 11 and a pair of tool holder extensions 12 in accordance with the present invention.

The circle cutter 11 comprises a longitudinally extending channel shaped beam 13 including an upper cross web 14 and parallel longitudinal legs or flanges 16 coextensive with web 14 and having formed in their upper border track defining longitudinal grooves 17.

A vertical arbor or shank 18, which may be tapered, having a lower threaded coupling section 19 engages a threaded vertical bore centrally formed in web 14. A flange 20 formed directly above coupling section 19 abuts the top face of web 14. Depending from and coaxial with arbor 18 is a retractable vertical centering pin 21 terminating in a sharp tip.

A symmetrical pair of tool holders 22 is slidably embraced by the confronting faces of legs 16 on opposite sides of the medial axis of beam 14 and equally spaced therefrom. Each tool holder 22 comprises a block 23 having along its upper border transversely projecting longitudinally extending followers or lips 24 slidably engaging respective tracks 17. A longitudinal adjusting screw 26 extends the length of one of the tracks and is suitably journaled to beam 13, the screw 26 having oppositely threaded opposite sections 27 engaging correspondingly threaded longitudinal bores formed in each of the corresponding tool holder lips 24. An end of the screw 26 is accessible to permit its rotation by a suitable tool and thereby to provide opposite concurrent longitudinal adjustment of tool holders 22.

Formed in each tool holder block 23 is a pair of transversely medially located vertically spaced threaded bores 28. A pair of cutting members 29 of generally known construction is provided, each of which includes a bottom blade section 30 and an enlarged rectangular upper section 32 having a pair of vertically spaced transversely medially located holes 33, the distance between holes 33 being equal to that between bores 28. When the circle-cutting device 10 is used to cut holes or circles of lesser diameters, a cutting member 29 is separably secured to the outside face of each tool holder 22 by a pair of screws traversing the cutting member holes 33 and engaging the respective threaded bores 28, the confronting faces of the tool holder and cutting member coupling section being in tight superimposed engagement.

In order to increase the range of diameters of the circles which may be cut by the circle-cutting device 10 a symmetrical pair of tool holder extensions 12 is provided. Each extension 12 includes a block 34 having an inverted T-shaped inside face 36 with an upper section matching the outside face of tool holder 22 and an outside cutting member engaging face 37 of greater height than that of outside face of tool holder 22. Integrally formed on the front face of each block 34 is a rectangular projection 39 which is coextensive in height with block 34 and extending outwardly therefrom in a vertical flange or lip 40, the upper part of projection 39 being spaced outwardly from the inside face of block 34 and the lower part 41 thereof extending to the inside face of block 34 and delineating a rectangular indent 42 in the front inside corner of block 34. The side of block 34 opposite to that of projection 39 has integrally formed thereon a transverse projection 43 similar in shape and location to that of projection 39 but differing therefrom in that its upper edge is below the upper edge of block 34.

Formed in each block 34 are three medially located equally vertically spaced longitudinal bores, 44, 45, 46 the upper bores 44 of which are smooth faced and the lowermost bores 46 of which are threaded. The distance between successive bores 44, 46 is equal to that between bores 28 so that when extension 12 is applied end to end with a tool holder 22 the bores 44 are in axial alignment with respective bores 28. There are provided a pair of long first screws 47 which are of greater lengths than the sum of the length of a pair of aligned bores 33 and 44 and a shorter screw 48 whose length is less than the sum of such sum.

In employing the circle- or hole-cutting device for cutting circles or holes of diameters greater than those which may be cut with the basic hole cutter 11, a cutting member 29 is applied to the outside end face 37 of a respective tool holder extension 12, a pair of screws 47 is advanced into engagement with a respective tool holder 22, with bores 44 in axial alignment with respective tool holder bores 28 and the screws 47 are then tightened in engagement with bores 28. The circle- or hole-cutting device 10 is now in condition for cutting a large diameter range of circles or holes in the conventional manner.

An alternative procedure includes the modification in which a cutting member 29 is first attached to the outside face 37 of each extension 12 by aligning the cutting tool lower bore 33 with a respective extension bore 46 and securing the assembly of cutter member extension and tool holder with the shorter screw 48. The longer screws 47 are then applied, only the lower of each pair engaging a cutting tool bore 33. In all other respects, the alternative procedure is similar to that first described.

While there has been described and illustrated a preferred embodiment of the present invention, it is apparent that numerous alterations, omissions and additions may be made without departing from the spirit thereof.

We claim:

1. A circle-cutting device comprising a longitudinally extending channel shaped beam including an upper cross web and opposite depending longitudinally extending legs, an arbor projecting centrally upwardly from said beam, a pair of similar tool holders longitudinally slidably engaged by said beam between said channel legs, each of said tool holders having an outwardly directed first face, means for oppositely adjusting said tool holders along the length of said beam symmetrical to the middle thereof, a pair of tool holder extensions having opposite inwardly and outwardly directed second and third faces respectively, a pair of cutting members, and means for detachably securing said tool holders to said holder extensions with respective pairs of said first and second faces in confronting engagement and said cutting members to said tool holder extension third faces.

2. The circle-cutting device of claim 1 wherein each of said tool holders has a pair of threaded first longitudinal bores vertically spaced a predetermined distance and each of said tool holder extensions has a pair of longitudinal bores vertically spaced by said predetermined distance, each of said cutting members includes in its upper part a pair of longitudinal bores spaced said predetermined distance and said securing means includes a pair of screws engaging a respective pair of said bores in said tool holder and extension in axial alignment.

3. The circle-cutting device of claim 2 in which each of said tool holder extensions includes a threaded longitudinal bore vertically spaced said predetermined distance below the lower most of said pair of bores formed in said extension.

4. The circle-cutting device of claim 1 wherein each of said tool holder first faces is of rectangular configuration and includes outwardly directed lips formed along the vertical side edges thereof and each of said extensions includes an inwardly directed projection engaged between said lips and terminating in said second face.

5. The circle-cutting device of claim 4 wherein said extension is of greater height than and extends below said tool holder.

6. A tool holder extension for use with a circle-cutting device including a beam carrying a tool holder adjustable along the length of the beam and having an outer tool engaging first face and a pair of threaded longitudinal bores vertically spaced a predetermined distance, said extension comprising a body member having an inside second face complementing said first face, a pair of longitudinal bores vertically spaced said predetermined distance and a tool engaging outer third face and a pair of screws traversing said extension bores and engagable with respective tool holder bores.

7. The extension of claim 6 wherein said body member has formed therein a threaded longitudinal third bore located below the lower of said body member bores said predetermined distance.

8. A circle-cutting device comprising a longitudinally extending horizontal beam, an arbor projecting upwardly from said beam, a tool, a tool holder mounted on said beam and adjustable along the length thereof and having an outwardly directed tool engaging first face, an extension member having inwardly and outwardly directed faces and means for separably connecting said extension member to said first face with said extension member inwardly directed face engaging said first face and said tool engaging said extension member outwardly directed face.

* * * * *